United States Patent [19]

Suzuki et al.

[11] Patent Number: 4,477,875
[45] Date of Patent: Oct. 16, 1984

[54] CONTROL SYSTEM FOR EXHAUST GAS-DRIVEN SUPERCHARGER USED IN VEHICLE ENGINE

[75] Inventors: Satoshi Suzuki; Hiroyuki Ando, both of Katsuta, Japan

[73] Assignee: Hitachi, Ltd., Tokyo, Japan

[21] Appl. No.: 267,723

[22] Filed: May 28, 1981

[30] Foreign Application Priority Data

May 28, 1980 [JP] Japan .................................. 55-70154

[51] Int. Cl.$^3$ ...................... F02B 37/12; F02D 23/02
[52] U.S. Cl. ................................. 364/431.08; 60/603; 60/605; 123/559; 364/431.06
[58] Field of Search ...................... 364/431.05, 431.06; 60/600, 601, 602, 603

[56] References Cited

U.S. PATENT DOCUMENTS

| | | | |
|---|---|---|---|
| 4,322,948 | 4/1982 | Emmenthal et al. | 60/602 |
| 4,372,119 | 2/1983 | Gillbrand et al. | 60/600 |
| 4,387,571 | 6/1983 | Katsumata et al. | 60/602 |

FOREIGN PATENT DOCUMENTS

| | | | |
|---|---|---|---|
| 54-10820 | 1/1979 | Japan | 60/602 |
| 55-98626 | 7/1980 | Japan | 60/603 |
| 2054739 | 2/1981 | United Kingdom | 60/602 |

OTHER PUBLICATIONS

Simanaitis: Saab Turbo Boost with a Brain, Road and Track, Jun. 1980, pp. 82, 84, 86.

Primary Examiner—Felix D. Gruber
Attorney, Agent, or Firm—Antonelli, Terry & Wands

[57] ABSTRACT

A system for controlling an exhaust gas-driven supercharger used in an internal combustion engine for an automotive vehicle includes an exhaust gas bypass passage connecting between selected portions of the exhaust gas conduit upstream and downstream of a turbine of the supercharger, and an exhaust bypass valve disposed midway of the exhaust gas bypass passage for controlling the quantity of engine exhaust gases. In the supercharger control system, an actuator responsive to a digital control signal is employed for actuating the exhaust bypass valve. A microcomputer calculates the opening of the exhaust bypass valve so that the supercharged air pressure may not exceed the critical point giving rise to knocking, and such a digital control output signal is applied to energize the actuator so that the supercharged air pressure can be controlled with highest efficiency over a wide operation range of the engine.

21 Claims, 19 Drawing Figures

FIG. I

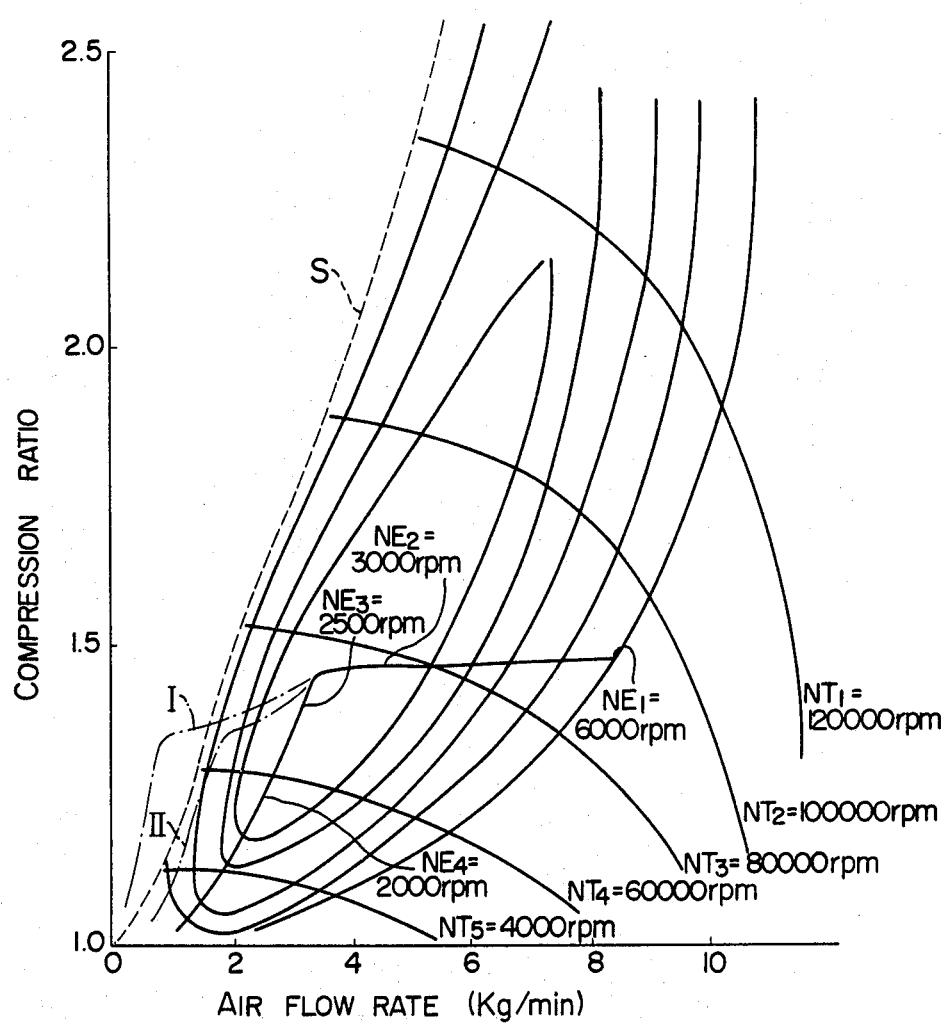

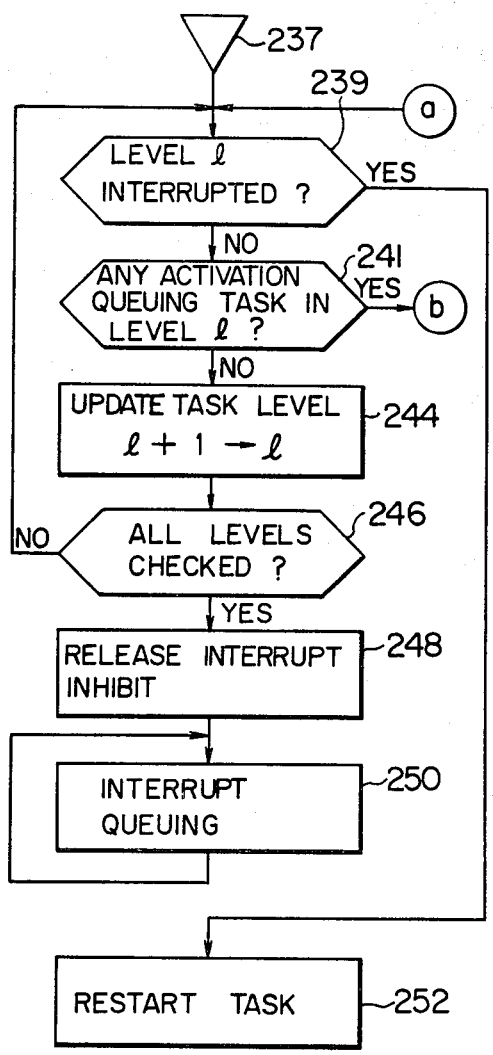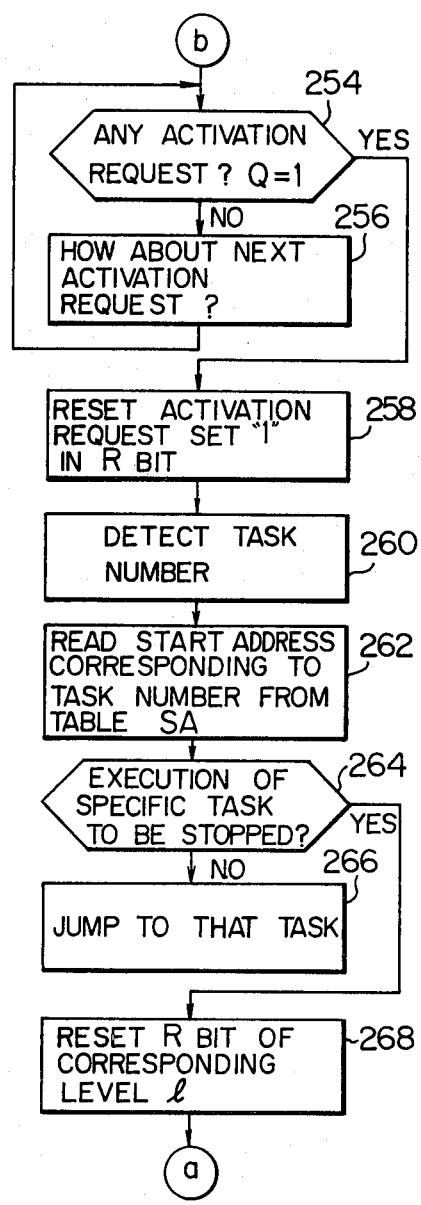

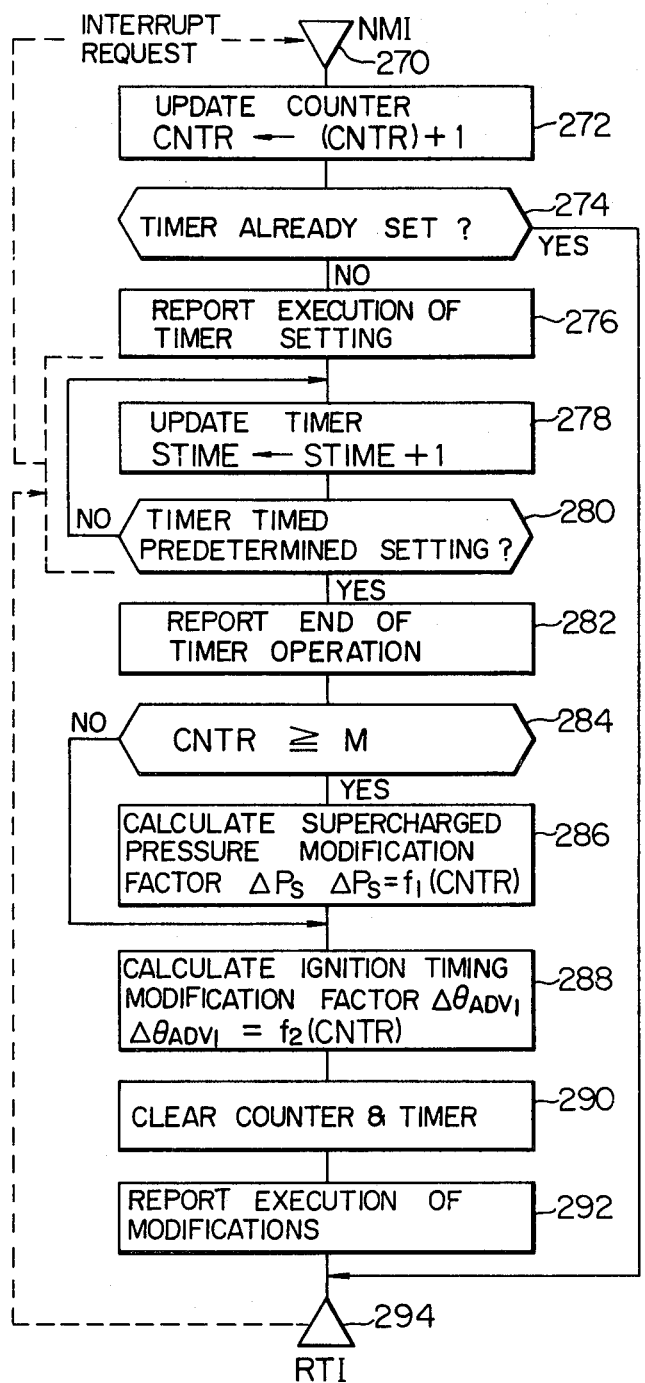

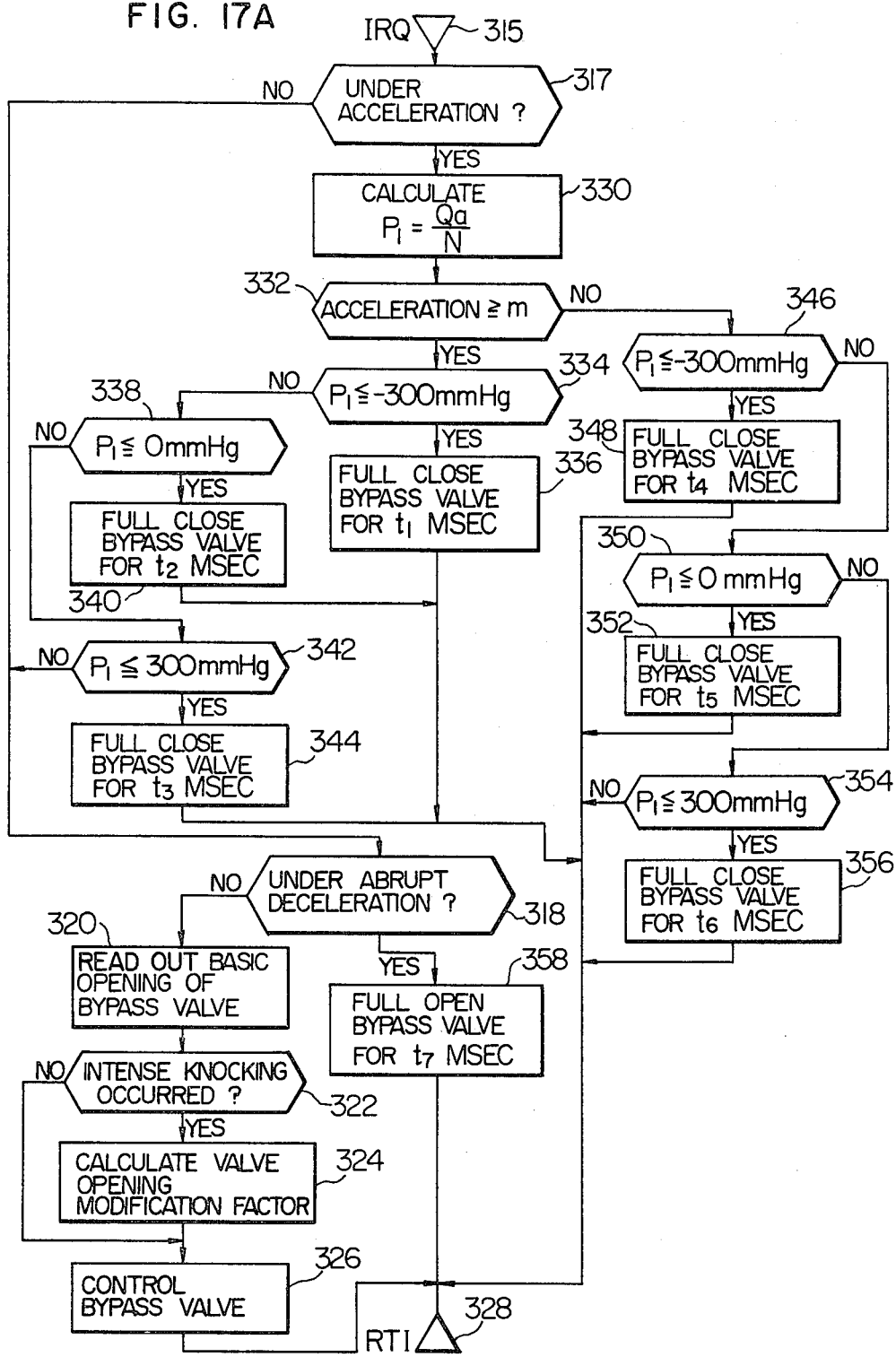

CONTROL SYSTEM FOR EXHAUST GAS-DRIVEN SUPERCHARGER USED IN VEHICLE ENGINE

FIELD OF THE INVENTION

This invention relates to a method and apparatus for controlling an exhaust gas-driven supercharger used in an internal combustion engine for automotive vehicles, and more particularly to a supercharger control system suitable for use in combination with an engine control method and apparatus in which a microcomputer is used for the overall control of the ignition timing and the quantity of fuel supplied to the internal combustion engine.

BACKGROUND OF THE INVENTION

It is known that supercharging of air supplied to an internal combustion engine by a compressor driven by a turbine rotated by the velocity energy of engine exhaust gases is effective for reducing the fuel consumption and improving the output characteristics of the engine.

A method for controlling the pressure of air supercharged by the compressor is also known in which selected portions of the exhaust gas conduit upstream and downstream of the turbine is connected by an exhaust gas bypass passage, and an exhaust bypass valve is disposed in this exhaust gas bypass passage so as to control the quantity of engine exhaust gases flowing through the exhaust gas bypass passage.

However, due to the fact that the pressure of air sucked into the intake pipe of the engine is generally utilized for the control of the exhaust bypass valve, the known control method has been defective in that the pressure of supercharged air cannot be controlled at the highest efficiency over a wide operation range of the engine.

SUMMARY OF THE INVENTION

It is therefore a primary object of the present invention to provide a novel and useful system for controlling an exhaust gas-driven supercharger used in an internal combustion engine for automotive vehicles, which can control the supercharged air pressure at the highest efficiency over a wide operation range of the engine.

The supercharger control system according to the present invention is featured by the fact that an actuator responding to a digital control signal is employed to actuate the exhaust bypass valve, and a microcomputer is used to control the opening of the exhaust bypass valve so that the supercharged air pressure may not exceed the critical point giving rise to knocking, such a digital output signal being applied from the microcomputer to energize the actuator so that the supercharged air pressure can be controlled at the highest efficiency over a wide operation range of the engine.

BRIEF DESCRIPTION OF THE DRAWINGS

The above and other objects, features and advantages of the present invention will become more clear from the following detailed description with reference to the accompanying drawings, in which:

FIG. 9 is a graph showing the compression ratio of the compressor relative to the flow rate of intake air per minute at various rotation speeds of the turbine and engine to illustrate how the opening of the exhaust bypass valve is controlled during deceleration of the engine;

FIGS. 12 and 13 are respective portions of a flow chart illustrating the steps of processing in the task dispatcher shown in FIG. 11;

FIG. 15 is a flow chart of a knocking signal processing program;

FIG. 17A is a flow chart of a supercharged air pressure control processing program;

DETAILED DESCRIPTION

An embodiment of the supercharger control system according to the present invention will now be described in detail with reference to the drawings.

Figure 1:
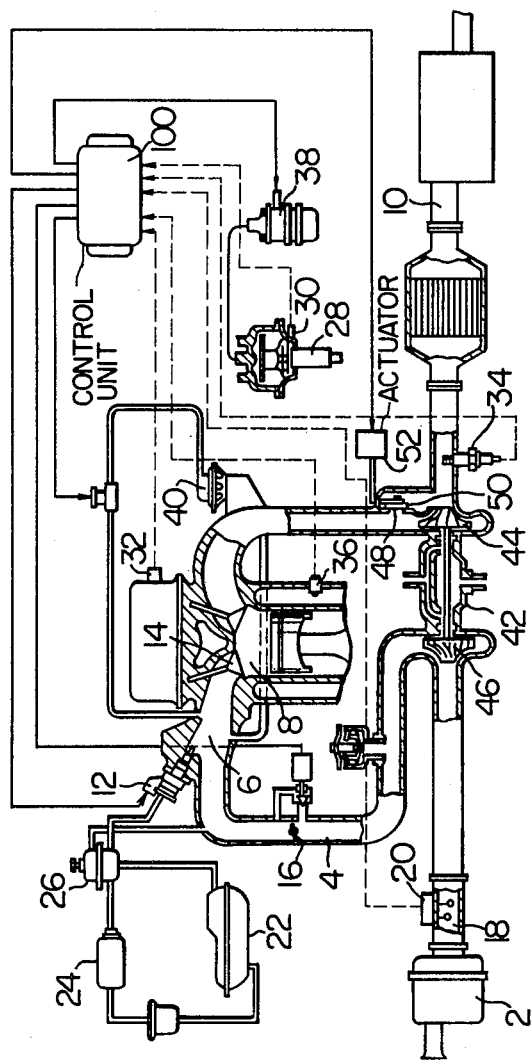
FIG. 1 is a partly sectional diagrammatic view showing an engine control system including an embodiment of the supercharger control system according to the present invention.

FIG. 1 shows an embodiment of the control system according to the present invention forming part of an overall control system controlling an internal combustion engine of the spark ignition type. Referring to FIG. 1, intake air passes through an air cleaner 2, a throttle chamber 4 and an intake pipe 6 to be supplied into cylinders 8 of the engine. After combustion in the cylinders 8, exhaust gases pass through an exhaust gas pipe 10 to be discharged into the atmosphere.

The throttle chamber 4 is provided with an injector 12 for fuel injection, and an air-fuel mixture is supplied into the combustion chamber of each of the cylinders 8 when an associated suction valve 14 is opened.

An air passage 18 is provided upstream of a throttle valve 16 in the throttle chamber 4, and a hot wire sensor 20 constituting a heat generator of a thermal type air flow meter is disposed in this air passage 18 to provide an electrical output signal varying depending on the velocity of air determined by the relation between the velocity of air and the quantity of heat transmitted from the heat generator.

Fuel is supplied from a fuel tank 22 to the injector through a fuel pump 24 and a fuel pressure regulator 26.

A crank angle sensor 30 is associated with a distributor 28 to generate a reference crank angle signal including pulses each of which appears when the crankshaft rotates through a reference crank angle and a crank position signal including pulses each of which apearas when the crankshaft reaches a predetermined angular position of, for example, 0.5° during rotation of the engine crankshaft.

A knocking sensor 32 for sensing knocking is mounted on the cylinders 8. In addition to the crank angle sensor 30 and the knocking sensor 32, there are provided a λ sensor 34 and a cooling water temperature sensor 36 as shown in FIG. 1. Signals including the electrical output signals from the crank angle sensor 30, knocking sensor 32, λ sensor 34 and cooling water temperature sensor 36 as well as the electrical output signal from the hot wire sensor 20 are applied to a control unit 100 which may be, for example, a microcomputer in which input data is to be arithmetically processed, and control signals are applied from the control unit 100 to control the injector 12 and an ignition coil 38. In timed relation with the ignition timing, a high voltage is applied from the distributor 28 to a spark plug (not shown) in each of the cylinders 8. Reference numeral 40 designates an exhaust gas recirculation control valve (which will be referred to hereinafter simply as an EGR control valve).

A supercharger 42 including a turbine 44 and a compressor 46 is incorporated in the suction-exhaust system for the purpose of improving the fuel consumption and power output of the engine by recovery of the exhaust gas energy. The turbine 44 of the supercharger 42 is rotated by the stream of exhaust gases from the engine, and the compressor 46 constructed integrally with the turbine 44 supplies supercharged air to the engine. In order to control the supercharged air pressure, selected portions of the exhaust gas conduit upstream and downstream of the turbine 44 are connected by an exhaust gas bypass passage 48, and an exhaust bypass valve 50 is disposed in this exhaust gas bypass passage 48. This exhaust bypass valve 50 is controlled by an electrical actuator 52. Therefore, as the exhaust bypass valve 50 is progressively opened under control of the actuator 52, the flow rate of exhaust gases flowing into the turbine 44 is progressively decreased to correspondingly lower the supercharged air pressure.

Figure 2:
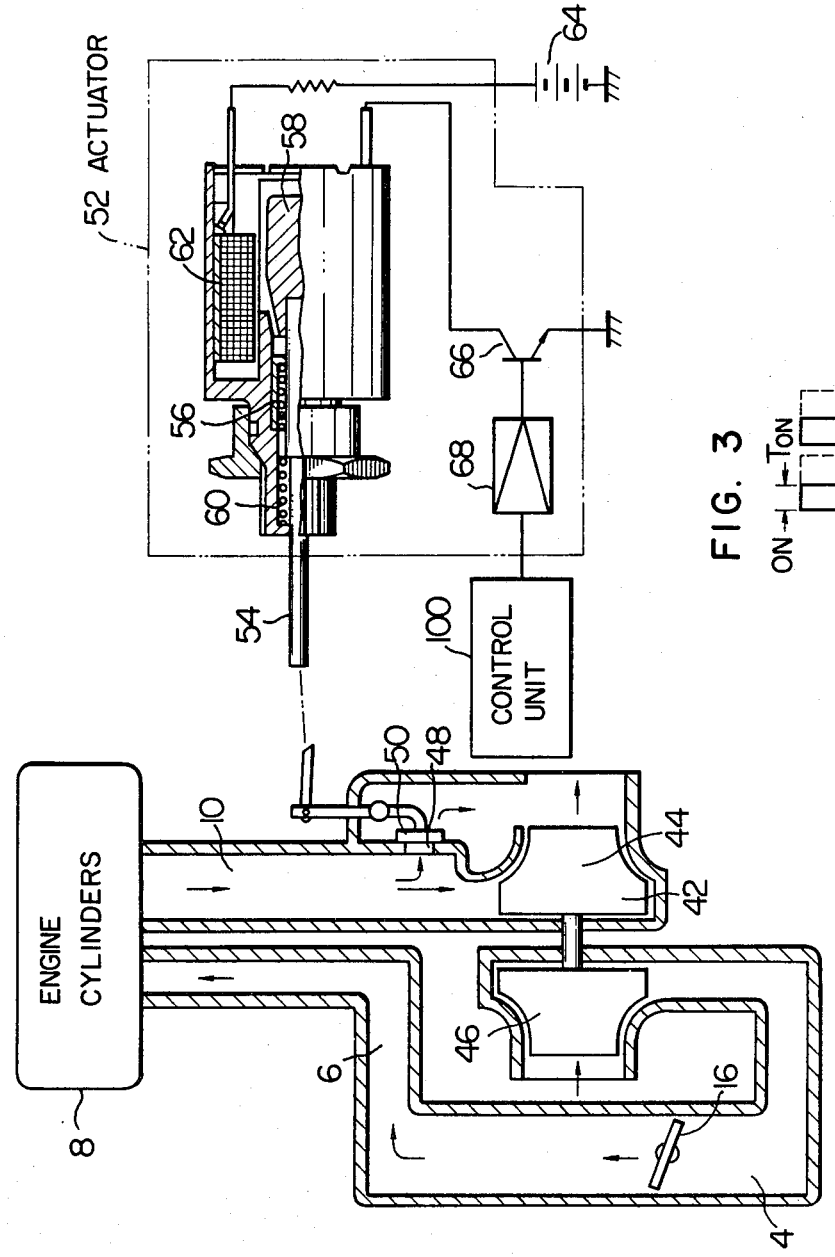
FIG. 2 is a partly sectional detail view of the supercharger control part in the control system shown in FIG. 1.

The detailed structure of the supercharged air pressure control mechanism is shown in FIG. 2. With progressive opening of the exhaust bypass valve 50, the quantity of exhaust gases flowing through the exhaust gas bypass passage 48 increases progressively thereby correspondingly lowering the rotation speed of the turbine 44.

Figure 3:
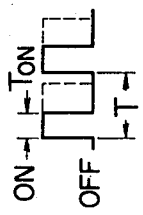
FIG. 3 illustrates a pulse signal applied to the actuator actuating the exhaust bypass valve for controlling the supercharger.

The exhaust bypass valve 50 is connected by a rod 54 to a plunger 58 of an electromagnet 56. The plunger 58 is normally urged by the force of a spring 60 in a direction in which the exhaust bypass valve 50 is full closed. A high-frequency pulse current having a period of about 10 msec as shown in FIG. 3 is supplied to the base of a transistor 66 connected between an electromagnetic coil 62 and a power source 64. The stroke of the plunger 58 is proportional to the ratio $T_{ON}/T$ between the duration $T_{ON}$ of the pulse current and the pulse period T. This ratio $T_{ON}/T$ will be referred to hereinafter as an on-duty. The value of this on-duty is calculated in the control unit 100, and the pulse current having the calculated on-duty is supplied from the control unit 100 to the base of the transistor 66 through an amplifier 68.

The detailed general structure of the supercharger control system including the control unit 100 will now be described with reference to FIG. 10.

Figure 10:
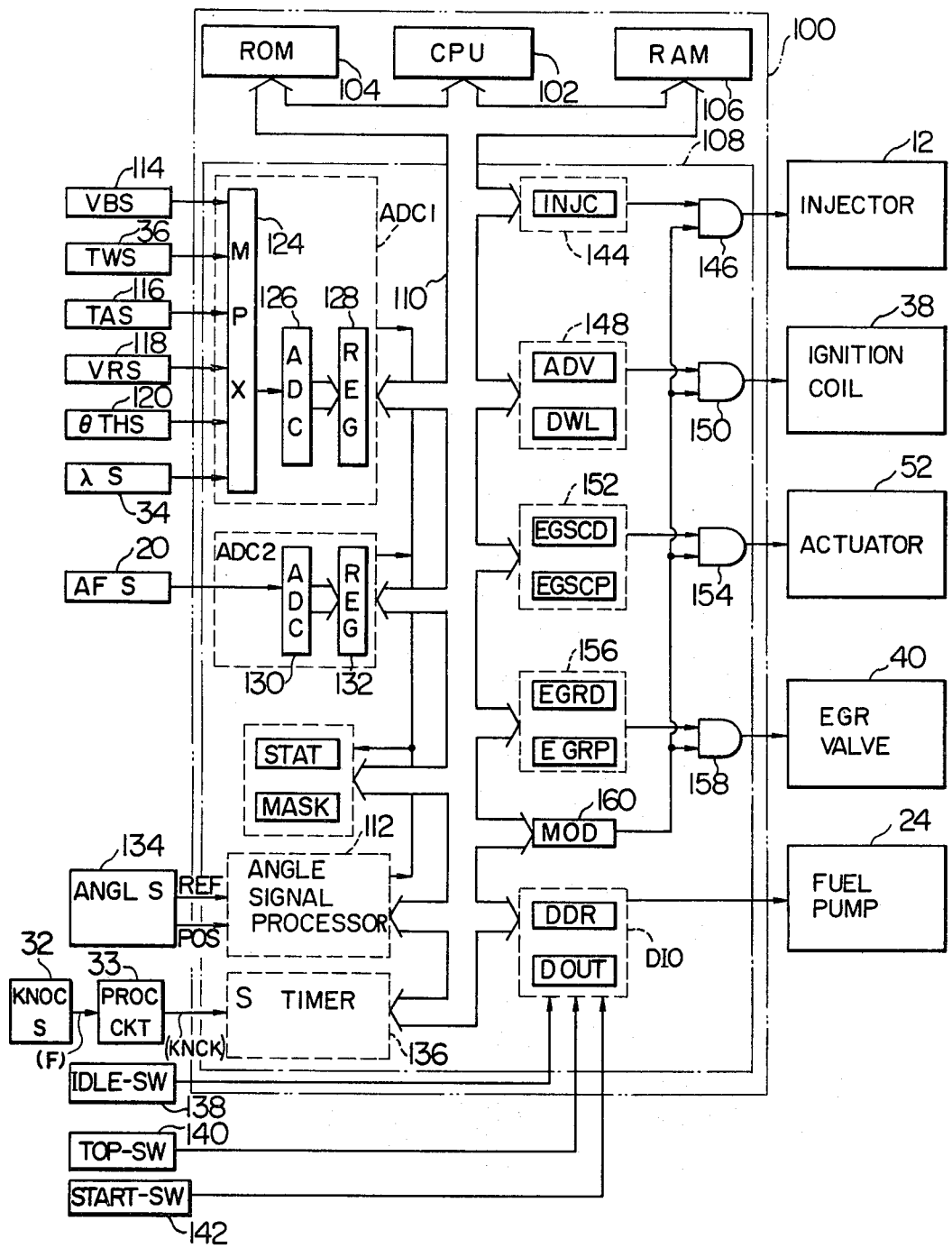
FIG. 10 is a block diagram showing the detailed general structure of the control unit shown in FIG. 1.

Referring to FIG. 10, the control unit 100 includes a central processing unit 102 (which will be referred to hereinafter simply as a CPU), a read-only memory 104 (which will be referred to hereinafter simply as an ROM), a random access memory 106 (which will be referred to hereinafter simply as an RAM), and an input/output interface circuit 108. The CPU 102 performs necessary calculations on input data supplied from the input/output interface circuit 108 according to various programs stored in the ROM 104 and supplies the results of calculations to the input/output interface circuit 108 again. The RAM 106 is used for temporary storage of various data required for these calculations. A bus line 110 including data buses, control buses and address buses is provided for the transfer of various data between the CPU 102, ROM 104, RAM 106 and input/output interface circuit 108.

The input/output interface circuit 108 includes input means such as a first analog-digital converter (which will be referred to hereinafter simply as an ADC1), a second analog-digital converter (which will be referred to hereinafter simply as an ADC2), an angle signal processing circuit 112, and a discrete input/output circuit (which will be referred to hereinafter simply as a DIO) for the input and output of 1-bit information.

The ADC1 includes a multiplexer 124 (which will be referred to hereinafter simply as an MPX). Applied to the MPX 124 are an output signal from a battery voltage sensor 114 (which will be referred to hereinafter simply as a VBS), an output signal from the cooling water temperature sensor 36 (which will be referred to hereinafter simply as a TWS), an output signal from an ambient air temperature sensor 116 (which will be referred to hereinafter simply as a TAS), an output signal from a regulated voltage generator 118 (which will be referred to hereinafter simply as a VRS), an output signal from a throttle angle sensor 120 (which will be referred to hereinafter simply as a θTHS) and an output signal from the λ sensor 34 (which will be referred to hereinafter simply as a λS). The MPX 124 selects one of these input signals to apply it to an analog-digital conversion circuit 126 (which will be referred to hereinafter simply as an ADC). The digital data provided by the output signal from the ADC 126 is registered in a register 128 (which will be referred to hereinafter simply as an REG).

On the other hand, an output signal from the hot wire sensor 20 (which will be referred to hereinafter simply as an AFS) is applied to the ADC2 to be subjected to analog-digital conversion by an analog-digital conversion circuit 130 (which will be referred to hereinafter simply as an ADC), and the digital data provided by the output signal from the ADC 130 is registered in a register 132 (which will be referred to hereinafter simply as an REG).

An angle sensor 134 (which will be referred to hereinafter simply as an ANGLS) generates an output signal indicative of a reference crank angle, for example, a crank angle of 180° (which signal will be referred to hereinafter simply as an REF) and an output signal indicative of a minute crank angle, for example, a crank angle of 1° (which signal will be referred to hereinafter as a POS). Both of these signals REF and POS are applied to the angle signal processing circuit 112 to be reshaped in their waveforms.

Figure 14:
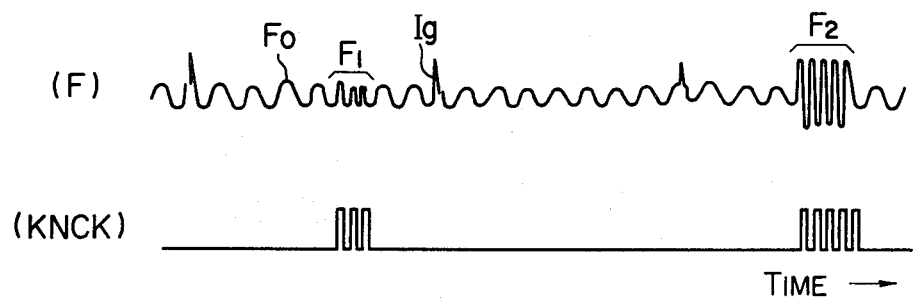
FIG. 14 illustrates an output signal appearing from the knocking sensor.

When a software timer 136 (which will be referred to hereinafter simply as an S timer) is actuated, the number of pulses of the output signal KNCK from a processing circuit 33, which is coupled to receive the output signal (F) of the knocking sensor 32, is counted in a manner as will be described later with reference to FIG. 14.

The DIO has inputs connected to an idle switch 138 (which will be referred to hereinafter simply as an IDLE-SW), a top gear switch 140 (which will be referred to hereinafter simply as a TOP-SW), and a starter switch 142 (which will be referred to hereinafter simply as a START-SW).

Description will now be directed to various pulse output circuits in the input/output interface circuit 108 for controlling various objects on the basis of the results of calculations executed by the CPU 102. The digital data output signal indicative of the result of calculation of the quantity of fuel to be injected is applied from the CPU 102 to an injector control circuit 144 (which will be referred to hereinafter simply as an INJC) to be converted into a corresponding pulse output signal. Therefore, a pulse signal having a pulse width corresponding to the calculated quantity of fuel to be injected appears from the INJC 144 to be applied to the injector 12 through an AND gate 146.

An ignition pulse generator circuit 148 (which will be referred to hereinafter simply as an IGNC) includes a register for a data for setting the ignition timing (which register will be referred to hereinafter as an ADV) and another register registering data for setting the starting time of primary current supply to the ignition coil 38 (which register will be referred to hereinafter as a DWL). These data are supplied from the CPU 102 to be stored in the registers ADV and DWL. IGNC 148 generates an ignition pulse signal on the basis of the data stored in registers ADV and DWL, and the ignition pulse signal is applied through an AND gate 150 to an amplifier energizing the ignition coil 38.

An exhaust bypass valve control circuit 152 (which will be referred to hereinafter simply as an EGSC) applies a pulse signal to the actuator 52 through an AND gate 154 for controlling the opening of the exhaust bypass valve 50. EGSC 152 includes a register EGSCD for storing data for setting the on-duty of the pulse signal shown in FIG. 3 and another register EGSCP for storing data for setting the pulse repetition period.

An EGR control pulse generator circuit 156 (which will be referred to hereinafter simply as an EGRC) controlling the EGR control valve 40 includes a register EGRD for storing data for setting the on-duty of the pulse signal used for controlling the EGR control valve 40 and another register EGRD for storing data for setting the pulse repetition period. The output pulse signal from EGRC 156 is applied through an AND gate 158 to a transistor actuating the EGR control valve 40.

The 1-bit input and output signals are controlled by the DIO. The 1-bit input signals include output signals from the IDLE-SW 138, TOP-SW 140 and START-SW 142. The 1-bit output signal appearing from the DIO is a pulse signal actuating the fuel pump 24. The DIO includes a register DDR for storing data for determining whether the terminal thereof is to be operated as an input terminal or an output terminal, and another register DOUT for latching output data.

A mode register 160 (which will be referred to hereinafter as an MOD register) stores instructions used for commanding the operation mode of the various elements of the input/output interface circuit 108. When, for example, an instruction is stored in this MOD register 160, all of the AND gates 146, 150, 154 and 158 are turned on or turned off. Therefore, when such an instruction is stored in the MOD register 160, the supply of output signals from INJC 144, IGNC 148, EGSC 152 and EGRC 156 can be stopped, or the starting of the operations of these elements can be controlled, as desired.

Description will next be directed to the manner of control of the exhaust bypass valve 50 in the supercharger control system according to the present invention.

Figure 4:
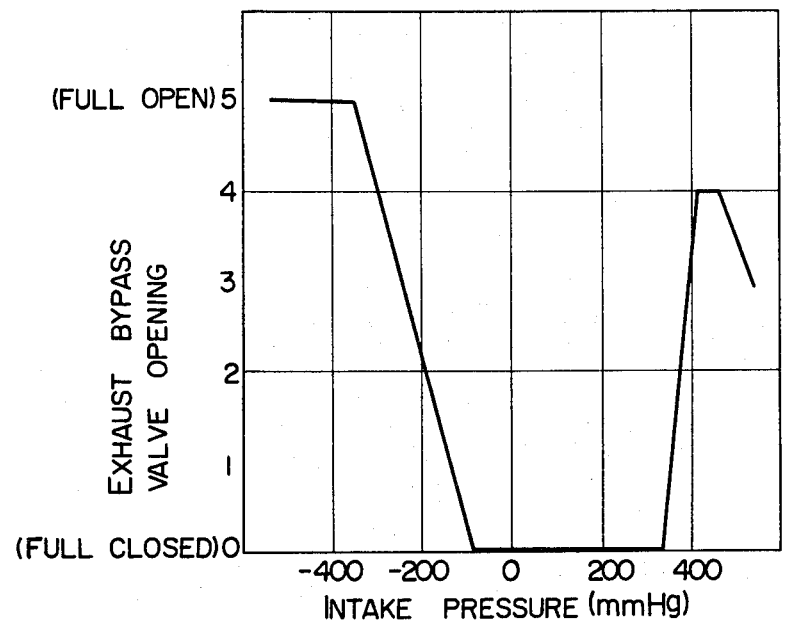
FIG. 4 is a graph showing the opening of the exhaust bypass valve relative to the intake pressure in the intake pipe when the rotation speed of the engine is constant.

FIG. 4 shows the relation between the opening of the exhaust bypass valve 50, hence, the stroke of the plunger 58 and the intake pressure in the intake pipe 6 of the engine. In FIG. 4, it is assumed that the rotation speed of the engine is maintained constant. In a region in which the value of the negative pressure is large, the opening of the exhaust bypass valve 50 is increased so as to decrease the quantity of exhaust gases flowing toward the turbine 44, so that the turbine 44 may not work wastefully, thereby improving the fuel consumption. In a region ranging from a certain value of the negative pressure to the atmospheric pressure, the opening of the exhaust bypass valve 50 is progressively decreased so as to permit the introduction of a progressively larger quantity of exhaust gases toward the turbine 44. At a pressure in the vicinity of atmospheric pressure, the exhaust bypass valve 50 is fully closed to permit the introduction of the full quantity of exhaust gases toward the turbine 44 so that the supercharging effect on the engine can be fully exhibited. In a region ranging from atmospheric pressure to a predetermined positive pressure, the exhaust bypass valve 50 is kept in its fully closed position. After the supercharged air pressure attains the level of the predetermined positive pressure, the exhaust bypass valve 50 is progressively opened, and in a higher pressure region, the exhaust bypass valve 50 is progressively closed again to enhance the effect of supercharging.

Figure 5:
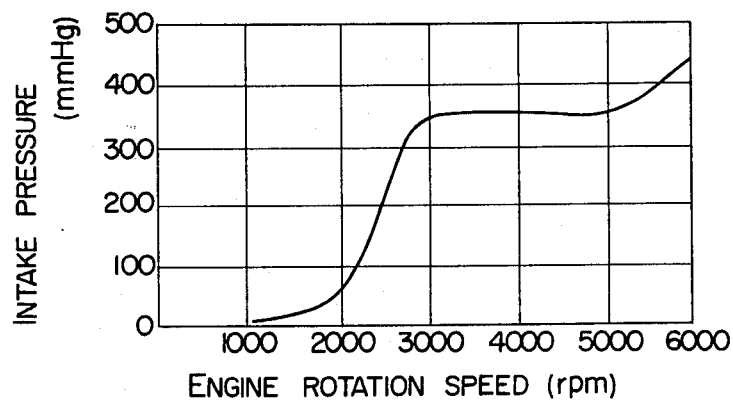
FIG. 5 is a graph showing the supercharged air pressure relative to the rotation speed of the engine when the throttle valve is in its full open position.
Figure 6:
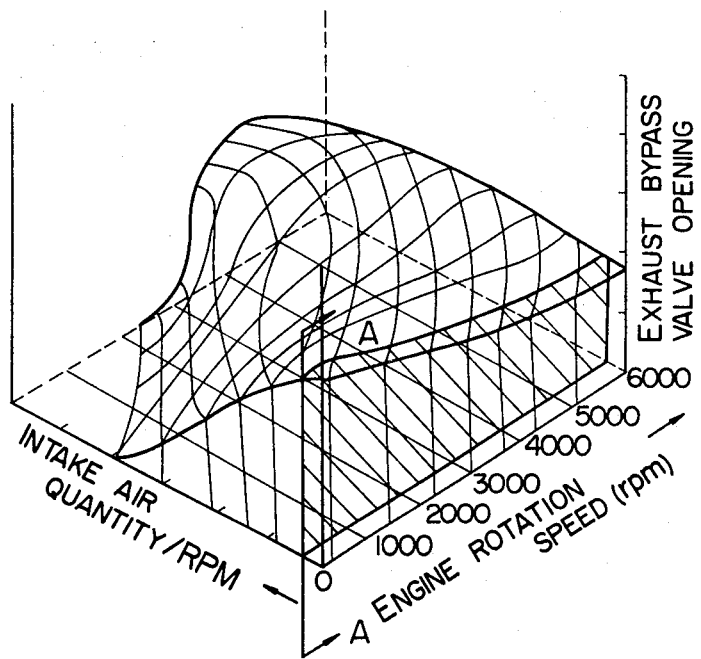
FIG. 6 is a graph showing the opening of the exhaust bypass valve relative to the rotation speed of the engine and the quantity of intake air per rpm of the engine.

FIG. 5 shows the relation between the rotation speed of the engine and the intake pressure in the intake pipe 6 of the engine. FIG. 5 shows the above relation when the throttle valve 16 is fully opened to increase the rotation speed of the engine, and it will be seen that the supercharged air pressure is increased with an increase in the rotation speed of the engine. The combination of the graphs shown in FIGS. 4 and 5 provides a graph as shown in FIG. 6. It will be seen in FIG. 6 that the opening of the exhaust bypass valve 50 is determined depending on the rotation speed of the engine and the quantity of intake air per rpm of the engine.

The mapping of the opening of the exhaust bypass valve 50 relative to the rotation speed of the engine and the quantity of intake air shown in FIG. 6 is used as the basis of the control, and the basic data of the opening of the exhaust bypass valve 50 relative to those of the engine rotation speed and intake air quantity are stored in the ROM 104 of the microcomputer.

The graph of FIG. 6 is merely illustrative of an example, and it is needless to mention that the illustrated characteristics are variable depending on the type of an engine. In summary, a mapping of the basic data of the opening of the exhaust bypass valve 50 determined depending on the rotation speed of the engine and the quantity of intake air is stored in the ROM 104.

Figure 7:
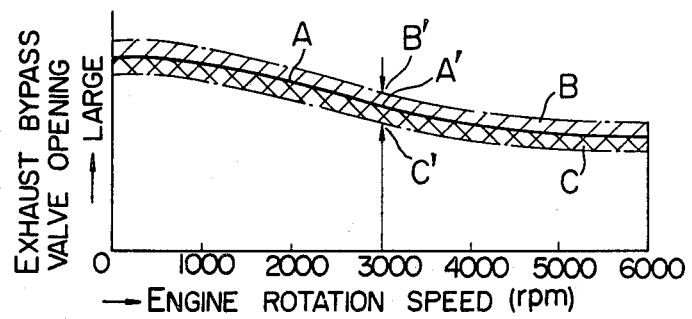
FIG. 7 is a graph showing the opening of the exhaust bypass valve relative to the rotation speed of the engine when a kocking sensor is used for the purpose of feedback control.

The use of the supercharger 42 tends to give rise to knocking during operation of the engine. The knocking sensor 32 is provided for the purpose of sensing occurrence of knocking. Thus, in response to the occurrence of knocking, the exhaust bypass valve 50 is so controlled as to decrease the supercharged air pressure so that the supercharged air pressure can be controlled with very high efficiency. The characteristics shown in FIG. 6 are utilized for this purpose so as to control the opening of the exhaust bypass valve 50 in a manner as shown in FIG. 7. The curve A in FIG. 7 represents the basic data of the opening of the exhaust bypass valve 50, which data are stored in the ROM 104, and the opening of the exhaust bypass valve 50 is changed within a hatched range B. Thus, when, for example, the basic opening of the exhaust bypass valve 50 at the engine rotation speed of 3,000 rpm is given by a point A', the point A' is shifted to a point B' representing a larger opening of the exhaust bypass valve 50 in response to the occurrence of knocking.

Figure 8:
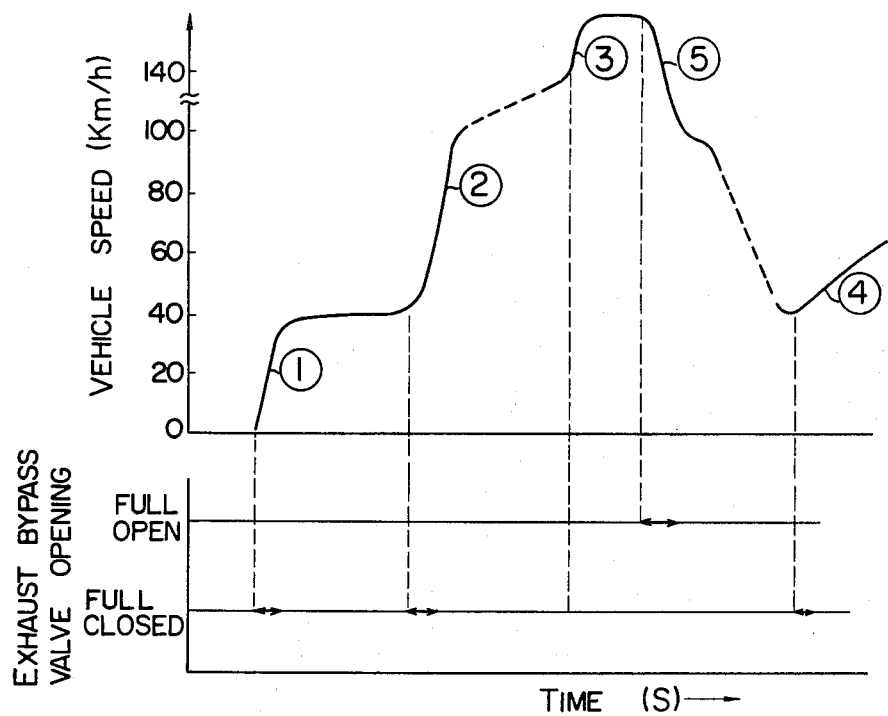
FIG. 8 is a graph showing how the opening of the exhaust bypass valve is controlled relative to time during acceleration and deceleration of the engine.

The above description refers to the control of the exhaust bypass valve 50 in the steady operation state of the engine. The manner of control is, however, as shown in FIG. 8 in a transient operation state of the engine. During the stages of acceleration ①, ② and ④ in FIG. 8, the exhaust bypass valve 50 is fully closed for a predetermined period of time to permit a rapid increase in the rotation speed of the engine. This period of time is not constant but variable depending on the degree of acceleration. However, in the stage ③ in which the engine is being accelerated under a high supercharged air pressure, the opening of the exhaust bypass valve 50 is maintained at the value employed before the engine is accelerated, so that the engine may not be destroyed due to an abrupt increase in the supercharged air pressure.

During the stage of deceleration ⑤ in FIG. 8, it is preferable to fully open the exhaust gas bypass valve 50 for a predetermined period of time. The reason therefor will be explained with reference to FIG. 9 which shows a mapping of the compression ratio of the compressor 46 of the supercharger 42 and the flow rate of air together with the engine operation curves. In FIG. 9, the curves NE represent the rotation speed of the engine, and the curves NT represent the rotation speed of the turbine 44. The broken curve S in FIG. 9 represents the surge line.

In the region to the left of the surge line S in FIG. 9, an air separation phenomenon occurs on the surface of the impellers of the compressor 46 resulting in the generation of a large separation noise. Since this air separation phenomenon tends to damage impellers, it is necessary to prevent the operating condition from shifting toward and into the region to the left of the surge line S.

During the stage of deceleration, the throttle valve 16 is almost fully closed, and the flow rate Qa of intake air supplied to the engine decreases. When the engine is decelerated during operation with the supercharged air pressure of, for example, 350 mmHg, the flow rate Qa of intake air will generally, quickly decrease although the supercharged air pressure provided by the compressor 46 does not decrease so appreciably as shown by the one-dot-dash curve Ⓘ, and the operating condition will shift to the left of the surge line S.

In order to avoid the above danger, it is important to lower the rotation speed of the compressor 46 as quickly as possible as shown by the one-dot-dash curve Ⓘ in FIG. 9. According to the best method for attaining the above requirement, the exhaust bypass valve 50 is fully opened so that a substantial proportion of exhaust gases can escape through the exhaust gas bypass passage 48.

A practical control program for carrying out the above manner of control of the exhaust bypass valve 50 will now be described.

Figure 11:
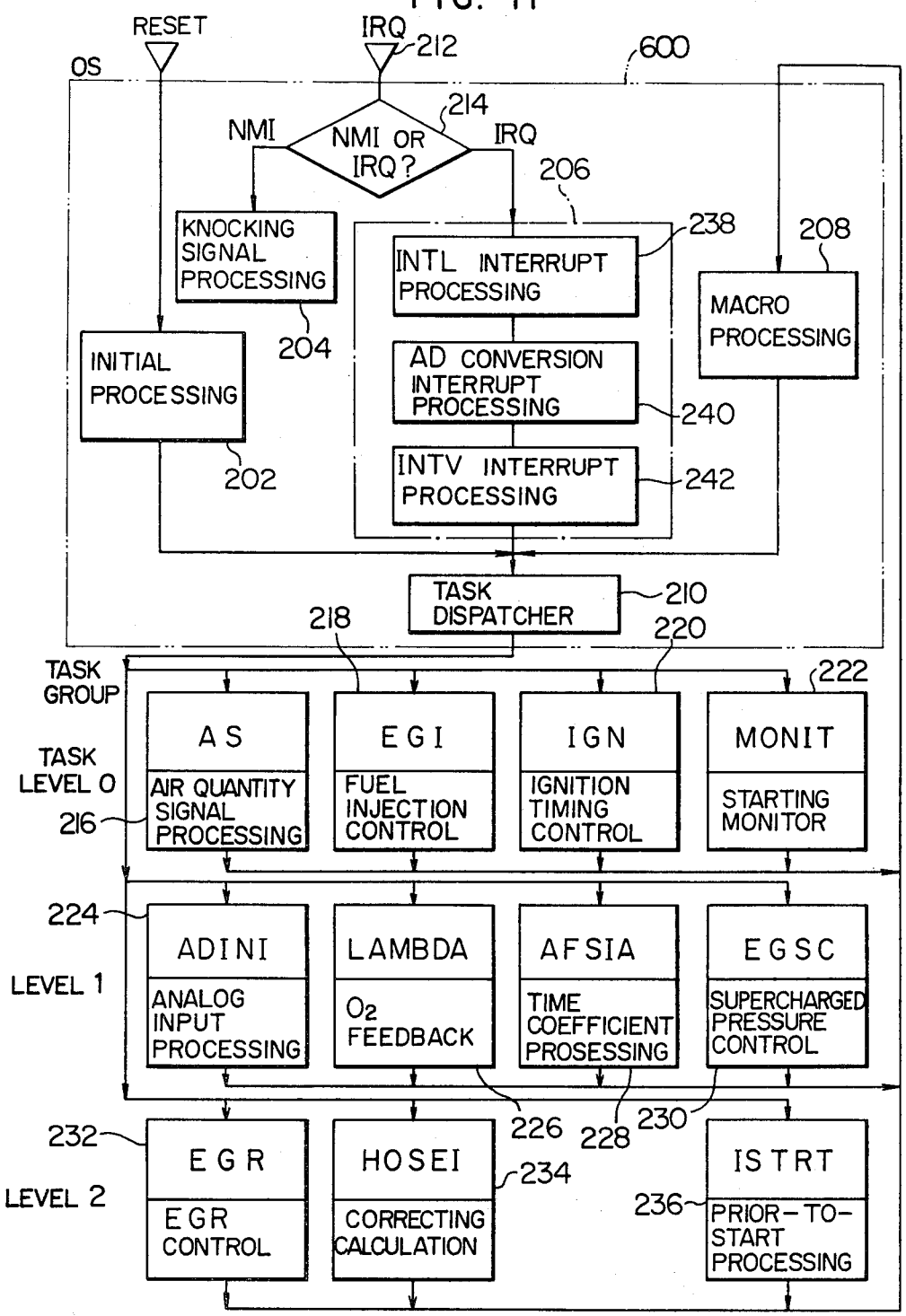
FIG. 11 is a diagram showing the basic arrangement of the program system employed in the control unit shown in FIG. 10.

FIG. 11 is a diagram showing the basic arrangement of the program system employed in the control unit 100 shown in FIG. 10.

Referring to FIG. 11, a management program 600 for managing a group of tasks includes an initial processing program 202, a knocking signal processing program 204, an interrupt processing program 206, a macro processing program 208 and a task dispatcher 210. The initial processing program 202 performs necessary preprocessing required for the operation of the microcomputer. This initial processing program 202 includes, for example, clearing of data stored in the RAM 106, setting of initial data to be registered in the registers in the input/output interface circuit 108, and receiving information inputs for performing the steps of preprocessing required for controlling the engine.

In response to the appearance of an interrupt request in step 212, whether this interrupt request is an NMI request or an IRQ request is judged in step 214 following the step 212. When the result of judgement in step 214 proves that the interrupt request is an NMI request, the knocking signal processing program 204 is executed in the next step. When, on the other hand, the result of judgement in step 214 proves that the interrupt request is an IRQ request, the interrupt processing program 206, which analyzes the character of an interrupt request IRQ in response to the application of such an interrupt request, applies an activation request to the task dispatcher 210 for starting execution of a necessary task in the group of tasks 216 to 236.

The interrupt processing program 206 includes an initial interrupt processing program 238 (which will be referred to hereinafter simply as an INTL interrupt processing program), an AD conversion interrupt program 240 and an internal interrupt processing program 242 (which will be referred to hereinafter simply as an INTV interrupt processing program). In the INTL interrupt processing program 238, an initial interrupt signal is generated in synchronism with the rotation of the engine. The rate of occurrence of this initial interrupt signal is one-half the number of the engine cylinders per revolution of the engine, that is, two when the number of cylinders is four. In response to such an initial interrupt signal, the data indicative of the duration of fuel injection calculated in an EGI task 218 is set in the input/output interface circuit 108. In the AD conversion interrupt processing program 240, the input point to be applied to the ADC 126 through the MPX 124 is specified, and the AD conversion takes place at the same time in the ADC 126, an ADC1 interrupt signal being generated after the conversion.

The signal indicative of the quantity $Q_A$ of intake air is applied from the AFS 20 to the ADC 130, and after the AD conversion, an ADC2 interrupt signal is generated. The interrupt signals described above appear before cranking only.

In the INTV interrupt processing program 242, an INTV interrupt signal is generated at time intervals of, for example, 10 msec registered in an INTV register to be used as a basic signal for monitoring the duration of the tasks to be activated at time intervals of a predetermined period. Each time this interrupt signal is generated, the S timer 136 is cleared, and the task to be executed now due to the arrival of the predetermined period is activated.

Task numbers indicative of the priority order are allocated to the individual tasks 216 to 236 in the task group, and all the tasks are classified into task levels 0, 1 and 2. The tasks belonging to the task level 0 include an air quantity signal processing task 216 (which will be referred to hereinafter simply as an AS task), a fuel injection control task (which will be referred to hereinafter simply as an EGI task), an ignition timing control task 220 (which will be referred to hereinafter simply as an IGN task), and an activation monitoring task 222 (which will be referred to hereinafter simply as an MONIT task). The tasks belonging to the task level 1 include an AD1 input task 224 (which will be referred to hereinafter simply as an ADIN1 task), an air-fuel ratio feedback task 226 (which will be referred to hereinafter simply as an LAMBDA task), a time coefficient processing task 228 (which will be referred to hereinafter simply as an AFSIA task), and a supercharged air pressure control task 230 (which will be referred to hereinafter simply as an EGSC task). The tasks belonging to the task level 2 include an exhaust gas recirculation control task 232 (which will be referred to hereinafter simply as an EGR task), a correcting calculation task 234 (which will be referred to hereinafter as an HOSEI task), and a prior-to-start processing task 236 (which will be referred to hereinafter simply as an ISTRT task). The individual tasks, execution of which is started in response to the individual interrupt signals, have predetermined activation periods respectively, and control programs therefor are stored in the ROM 104.

In response to the application of various interrupt requests requesting activation of the tasks above described, the task dispatcher 210 allocates the durations of occupation of the CPU 102 to the tasks on the basis of the priority order of the individual tasks corresponding to the activation requests.

FIGS. 12 and 13 are respective portions of a flow chart showing the steps of processing in the task dispatcher 210 shown in FIG. 10. Referring to FIG. 12, the task dispatcher 210 starts processing in step 237, and judgement is made in step 239 as to whether or not execution of a task belonging to a task level 1 is now interrupted. More precisely, when a flag "1" is present in the position of the execution bit, the task dispatcher 210 has not yet received the report of completion of the specific task as a result of processing according to the macro processing program 208, and this means that the task being executed has been interrupted due to the appearance of an interrupt request requesting execution of a task of higher priority level. Therefore, when the presence of the flag "1" in the position of the execution bit is detected, a jump from step 239 to step 252 occurs to re-start execution of the interrupted task in this step 252.

On the other hand, when the flag "1" is not present in the position of the execution bit, that is, when the execution display flag is reset, a shift from step 239 to step 241 occurs, and judgment is made in step 241 as to whether or not the task level 1 includes still an activation queuing task. In this case, the activation bits of the tasks in the task level 1 are retrieved in the order from the task of higher priority to that of lower priority. When the result of retrieval proves that the flag "1" is not present in any one of the activation bits of the tasks belonging to the task level 1, a shift from step 241 to step 244 occurs, and the task level is updated in step 244. That is, an increment "1" is added to the task level 1 to provide the task level (1+1). After the updating of the task level in step 244, a shift from step 244 to step 246 occurs, and judgment is made in step 246 as to whether or not all the task levels have been checked. When the result of judgment in step 246 proves that all the task levels have not yet been checked, that is, when the equation 1=2 does not hold, a return from step 246 to step 239 occurs so that the steps of processing according to the above sequence can be carried out again. On the other hand, when the result of judgment in step 246 proves that all the task levels have already been checked, a shift from step 246 to step 248 occurs, and the interrupt inhibit state is released. That is, the interrupt inhibit state maintained during the processing periods of from step 239 to step 246 is released in step 248. Step 250 following the step 248 is an interrupt queuing step.

A shift from step 241 to step 254 (FIG. 13) occurs when the result of step 241 proves that the task level 1 includes a task which is activation queuing, that is when the flag "1" is present in the position of the activation bit of a task belonging to the task level 1. In a loop including steps 254 and 256, a task having the flag "1" in its activation bit position in the task level 1 is retrieved in the order of from the task of higher priority to that of lower priority. When a task having the flag "1" in its activation bit position has been detected, a shift from the loop including steps 254 and 256 to step 258 occurs. In step 258, the activation bit, in which the flag "1" is present, is reset, and the flag "1" is now set in the position of the execution bit (which will be referred to hereinafter simply as an R bit) of the corresponding task level 1. In step 260, the task number of the task to be activated is detected, and in step 262, the start address information for activating the specific task is read out from a start address table SA stored in the RAM 106.

In step 264, judgment is made as to whether or not execution of the specific task is to be stopped. Herein, it is so judged that execution of the specific task is unnecessary when the start address information fetched from the RAM 106 represents a specific value, for example, a "0". When the result of judgment in step 264 proves that execution of the specific taks is to be stopped, a shift from step 264 to step 268 occurs so as to reset the R bit of the corresponding task level 1 in step 268. A return to step 239 then occurs, and judgment is made in step 239 as to whether or not execution of a task belonging to the task level 1 is being interrupted. This is because a flag may possibly be set in each of a plurality of activation bits in the same task level 1. Therefore, it is so arranged that a shift from step 268 to step 239 occurs after resetting the R bit of the specific task level 1 in step 268.

On the other hand, when the result of judgment in step 264 proves that execution of the specific task is not to be stopped or is to be carried out, a shift from step 264 to step 266 occurs, and the specific task is executed in step 266.

Sensing the occurrence of knocking will next be described with reference to FIG. 14. The output signal F from the knocking sensor 32 includes a light knocking signal component $F_1$, a middle knocking signal component $F_2$, a signal component $F_0$ other than the knocking signal components $F_1$, $F_2$, and an ignition signal noise component $I_g$, as shown in FIG. 14. The knocking signal components $F_1$ and $F_2$ only are extracted by a processing circuit 33 from the output signal F generated from the knocking sensor 32 to obtain a pulse train signal KNCK having a waveform as shown in FIG. 14.

FIG. 15 is a flow chart of a program for processing the knocking signal. According to this program, the pulse train signal KNCK is applied from the knocking signal processing circuit to the CPU 102, and an interrupt request NMI is generated in synchronism with the first pulse in the pulse train signal KNCK. The S timer 136 is actuated, and the associated counter CNTR (not shown) counts the number of pulses of the pulse train signal KNCK. On the basis of the count of the counter CNTR obtained during the actuated period of the S timer 136, the CPU 102 makes necessary calculations for attaining optimized control of the ignition timing.

Referring to FIG. 15, an interrupt request NMI appears in step 270, and the counter CNTR (not shown) provided in the RAM 106 starts its counting operation in step 272. An increment "1" is added to the count of the counter CNTR each time a pulse of the pulse train signal KNCK is applied, so that the count of the counter CNTR is progressively updated. In step 274 following the step 272, judgment is made as to whether or not the S timer 136 has already been actuated by detecting the presence or absence of a flag. When the result of judgment in step 274 proves that the S timer 136 has already been actuated, a jump from step 274 to step 294 occurs, and the interrupt step 212 shown in FIG. 11 is carried out. The S timer 136 is not acuated before application of the pulse train signal KNCK to the CPU 102. As soon as the first pulse of the pulse train signal KNCK is applied to the counter CNTR, a shift from step 274 to step 276 occurs, and execution of actuation of the S timer 136 is reported in step 276. In step 278, the operation of the S timer 136 is started in response to the first pulse of the pulse train signal KNCK, and the time count of the S timer 136 is progressively increased. In step 280, judgment is made as to whether or not the time count of the S timer 136 has attained a predetermined setting.

When the result of judgment in step 280 proves that the time count of the S timer 136 has not attained the predetermined setting, a return from step 280 to step 278 occurs, and the time count of the S timer 136 is further progressively increased in step 278. Thus, after the operation of the S timer 136 is started, the time count of the S timer 136 is progressively increased by the loop composed of steps 278 and 280. During the operation of this S timer 136, the number of pulses of the pulse train signal KNCK indicative of the intensity of knocking is counted by the counter CNTR.

When the result of judgment in step 280 proves that the time count of the S timer 136 has attained the predetermined setting, a shift from step 280 to step 282 occurs, and the completion of execution of timing operation of the S timer 136 is reported in step 282.

In step 284, judgment is made as to whether or not the sensed intensity of knocking (as represented by the number of pulses in signal KNCK, FIG. 14) is equal to or exceeds an allowable limit M. When the result of judgment in step 284 proves that the sensed intensity of knocking is so high that it is equal to or exceeds the allowable limit M, a modification factor $\Delta P_s$ for modifying the supercharged air pressure is calculated according to the relation $\Delta P_s = f_1 (CNTR)$ in step 286. No modification is applied to the supercharged air pressure when the sensed intensity of knocking is quite low or when no knocking has occurred. In step 288 following the step 286, a modification factor $\Delta \theta_{ADV1}$ for modifying the ignition timing is calculated according to the relation $\Delta \theta_{ADV1} = f_2 (CNTR)$. The factors $\Delta P_s$ and $\Delta \theta_{ADV1}$ are functions of the count of the counter CNTR which counts the number of pulses of the knocking signal KNCK applied during the operation of the S timer 136.

In step 290, both of the counter CNTR and the S timer 136 are cleared to prepare for later appearance of knocking. In step 292 following the step 290, execution of necessary modifications is reported to the task scheduler or dispatcher 210 to request that necessary modifications to deal with the appearance of knocking be made in an ignition timing control program shown in FIG. 16 and in a supercharged air pressure control program shown in FIG. 17.

Upon reporting the execution of necessary modifications in step 292, a return from step 294 to step 212 occurs so as to deal with a new interrupt request.

Description will next be directed to processing of the air quantity signal in the AS task 216.

The output voltage v appearing from the hot wire sensor 20 is given by $$v = \sqrt{c_1 + c_2 \sqrt{q_A}} \qquad (1)$$

where $q_A$ is the quantity (mass flow rate) of intake air. The equation (1) can be expressed as $$v^2 = c_1 + c_2 \sqrt{q_A} \qquad (2)$$

Suppose now that the hot wire sensor output voltage $v = v_0$ when the engine rotation speed $N=0$ and the mass flow rate $q_A = 0$. Then, the equation (2) is expressed as $$v_0^2 = c_1 \qquad (3)$$

Therefore, from the equations (2) and (3), the following equation (4) is obtained:

$$v^2 = v_0^2 + c_2 \sqrt{q_A} \qquad (4)$$

Hence, the momentary mass flow rate $q_A$ is provided by the following equation (5):

$$q_A = \frac{1}{c_2^2} (v^2 - v_0^2)^2 \qquad (5)$$

Therefore, the average air quantity $Q_A$ during one suction stroke is given by $$Q_A = \frac{q_{A1} + q_{A2} + \ldots + q_{An}}{n} \qquad (6)$$

$$= \frac{\sum_{n=1}^{n} q_{An}}{n}$$

Further, in the AS task 216, the rate of change of $Q_A$ within a predetermined period of time is calculated to judge whether the engine is under acceleration or deceleration. When the result of judgment proves that the engine is under acceleration or deceleration, necessary modifications are made directly or in another task, for example, the EGI task 218.

Figure 16:
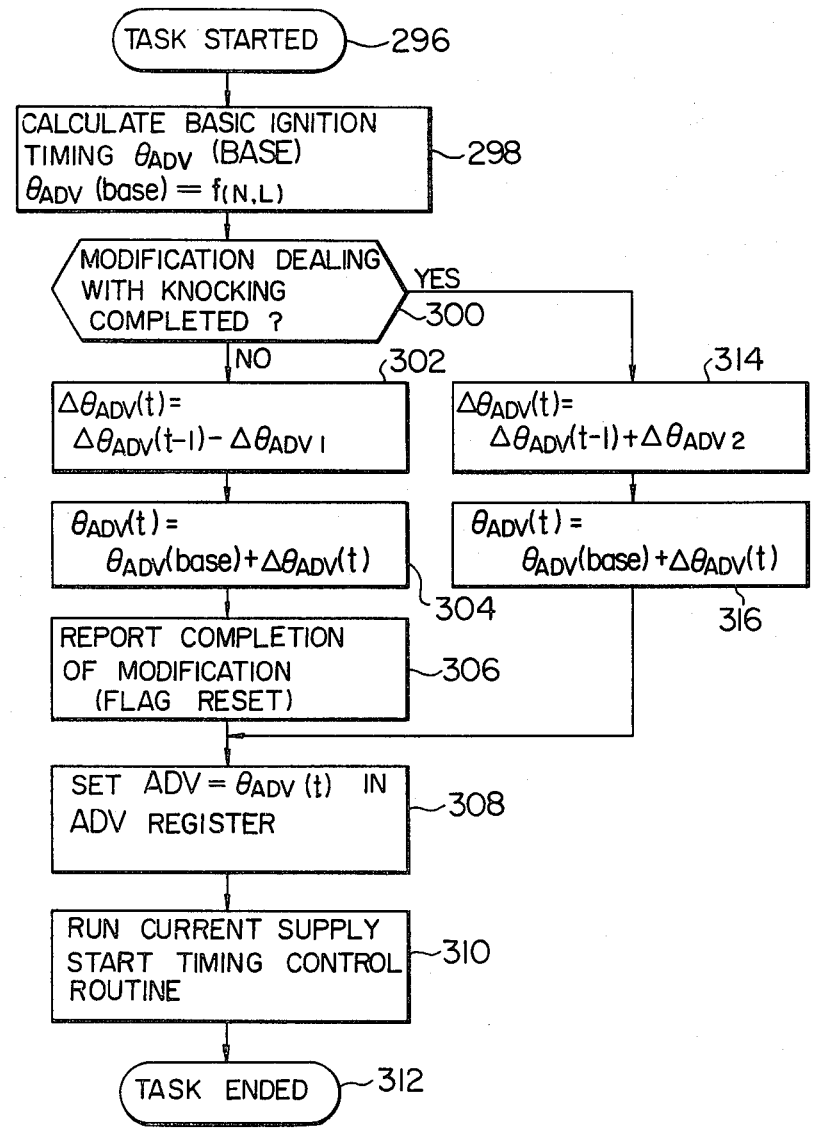
FIG. 16 is a flow chart of an ignition timing control processing program.

FIG. 16 is a flow chart of an ignition timing control program. In this ignition timing control program, the ignition timing is controlled by adding the aforementioned ignition timing modification factor $\Delta\theta_{ADV1}$ and a normal modification factor $\Delta\theta_{ADV2}$ as required to the calculated value of the basic ignition timing $\Delta_{ADV}$ (BASE).

Referring to FIG. 16, execution of the IGN task 220 is started in step 296, and the value of the basic ignition timing $\theta_{ADV}$ (BASE) is calculated according to the relation $\theta_{ADV}$(BASE)=f (N, L) in step 298, where N is the rotation speed of the engine and L is the value of negative pressure or vacuum in the intake pipe.

After the above calculation in step 298, judgment is made in step 300 as to whether the necessary modification dealing with the appearance of knocking has been completed or not ("YES" or "NO"). When the result of judgment in step 300 is "NO", that is, when the result of judgment proves that the necessary modification dealing with the occurrence of knocking has not still been executed, the ignition timing modification factor $\Delta\theta_{ADV}(t)$ is calculated in step 302 according to the following equation (7):

$$\Delta\theta_{ADV}(t)=\Delta\theta_{ADV}(t-1)-\Delta\theta_{ADV1} \qquad (7)$$

where $\Delta\theta_{ADV1}$ represents the present modification factor, and $\Delta\theta_{ADV}(t-1)$ represents the previous modification factor.

The ignition timing modification factor $\Delta\theta_{ADV}(t)$ calculated in step 302 is added in step 304 to the value of the basic ignition timing $\theta_{ADV}$ (BASE) calculated in step 298, as follows:

$$\theta_{ADV}(t)=\theta_{ADV}(BASE)+\Delta\theta_{ADV}(t) \qquad (8)$$

Subsequent to the modification in step 304, the completion of execution of the modification (flag resetting) is reported in step 306 following the step 304, and the data of the ignition timing $\theta_{ADV}(t)$ calculated in step 304 is registered in the advance register ADV in step 308.

After the registration of the data of the ignition timing $\theta_{ADV}(t)$ in the advance register ADV in the manner above described, a control routine for controlling the starting timing of primary current supply to the ignition coil 38 is executed in step 310 to complete the IGN task 220 in step 312.

When, on the other hand, the result of judgment in step 300 is "YES", that is, when the result of judgment proves that the necessary modification dealing with the occurrence of knocking has already been executed, a shift from step 300 to step 314 occurs, and the ignition timing modification factor $\Delta\theta_{ADV}(t)$ is calculated in step 314 according to the following equation (9):

$$\Delta\theta_{ADV}(t)=\Delta\theta_{ADV}(t-1)+\Delta\theta_{ADV2} \qquad (9)$$

where $\Delta\theta_{ADV}(t-1)$ represents the modification factor used immediately before the present modification, and $\Delta\theta_{ADV2}$ represents the normal modification factor which is a minimum modification unit. The ignition timing modification factor $\Delta\theta_{ADV}(t)$ calculated in step 314 is added in step 316 to the value of the basic ignition timing $\theta_{ADV}$(BASE) calculated in step 298. Thus, the data of the ignition timing $\theta_{ADV}(t)$ is now given by $$\theta_{ADV}(t)=\theta_{ADV}(BASE)+\theta_{ADV}(t) \qquad (10)$$

It will be apparent from the above equation (10) that the ignition timing having been retarded depending on the intensity of knocking in response to the occurrence of knocking is increased in the advance direction by an amount corresponding to the minimum unit of the ignition timing modification factor as soon as the knocking disappears.

The data of the ignition timing $\theta_{ADV}(t)$ calculated in step 316 is registered in the advance register ADV in step 308, and, then, the primary current supply starting timing control routine described above is executed in step 310 to complete the IGN task 220 in step 312.

FIG. 17A is a flow chart of a supercharged air pressure control program executed in the EGSC task 230. Referring to FIG. 17A, an interrupt request IRQ appears in step 315, and judgment is made in step 317 as to whether or not the engine is under acceleration.

The rate of change $Q_A$ during a predetermined time is calculated, and when the calculated value exceeds a predetermined threshold, it is determined that an acceleration condition exists. This determination is effected by the AS task 216. When the result of judgment in step 317 proves that the engine is not under acceleration, judgment is made in step 318 as to whether or not the engine is under abrupt deceleration. The engine is judged to be under abrupt deceleration when the throttle valve 16 is in its fully closed position at an engine rotation speed higher than a predetermined setting, and the IDLE-SW 138 generates its output signal.

When the result of judgment in step 318 proves that the engine is not under abrupt deceleration, the value of the previously stored data corresponding to the opening of the exhaust bypass valve 50 is read out from a look up table in step 320. More precisely, after detecting the rotation speed N of the engine and calculating the intake air quantity $Q_A$ according to the equation (6), the value of data corresponding to the opening of the exhaust bypass valve 50, as shown in FIG. 6, is retrieved from a table listing various values of the duty value, i.e. the time during which current flows through transistor 66 in actuator 55, which corresponds to the characteristics shown in FIG. 6, which table is stored in the ROM 104. Namely, the table stored in the ROM 104 lists the various values of the on-duty of the pulse current supplied to the transistor 66 in the actuator 52, in lieu of listing the various values of the opening of the exhaust bypass valve 50.

Then, in step 322, judgment is made to find whether or not intense knocking has occurred. When the result of judgment in step 322 proves that intense knocking has occurred, the value required for modifying the opening of the exhaust bypass valve 50 is calculated in step 324 in the same way as that described with reference to FIG. 7. The calculation in this step 324 is similar to that carried out in the step 286 of the program shown in FIG. 15. In step 326, this modified value is used to modify the pulse current supplied to the transistor 66 of the actuator 52 actuating the exhaust bypass valve 50, and, then, the EGSC task 230 is completed in step 328. On the other hand, when the result of judgment in step 322 proves that no knocking has occurred, a shift from step 322 to step 326 occurs, and the value of the opening of the exhaust bypass valve 50 retrieved from the table of the basic values stored in the ROM 104 is used to provide the pulse current supplied to the transistor 66 of the actuator 52 actuating the exhaust bypass valve 50. Then, the EGSC task 230 is completed in step 328.

Figure 17B:
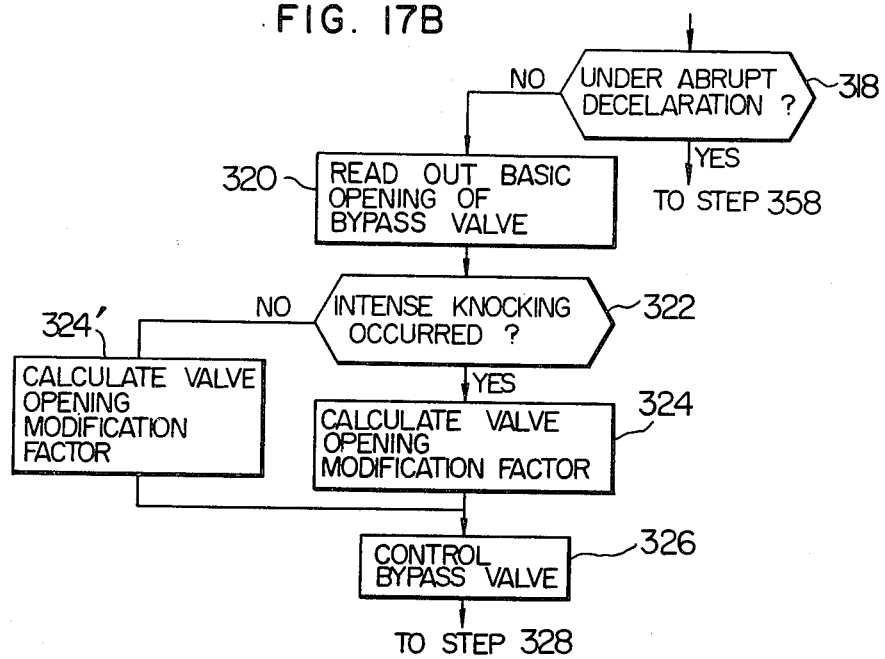
FIG. 17B is a partial modification of the program shown in FIG. 17A.

Although, in FIG. 17A, a direct shaft from step 322 to step 326 occurs to control the opening of the exhaust bypass valve 50 when the result of judgment in step 322 proves that no knocking has occurred, the manner of control may be such that the supercharged air pressure is increased until knocking occurs, as shown in FIG. 17B. Referring to FIG. 17B, when the result of judgment in step 322 proves that no knocking has occurred, a modification factor required for modifying the opening of the exhaust bypass valve 50 is calculated in step 324' in a manner similar to the calculation carried out in the step 286 in FIG. 15, so as to further increase the supercharged air pressure. Therefore, when, for example, the basic opening of the exhaust bypass valve 50 is represented by a point A' in FIG. 7 at the engine rotation speed of 3,000 rpm and no knocking has occurred at this opening of the exhaust bypass valve 50, the opening of the exhaust bypass valve 50 is controlled to be represented by a point C' which is variable within the cross-hatched range C in FIG. 7.

Returning to FIG. 17A, when the result of judgment in step 316 proves that the engine is under acceleration, the pressure $P_1$ in the intake pipe is calculated in step 330 according to the relation $P_1 = Q_a/N$. Then, in step 332, judgment is made as to whether or not the acceleration is equal to or exceeds a predetermined setting m. When the result of judgment in step 332 proves that the acceleration is equal to or exceeds the setting m, that is, when the speed curve has the gradients ①, ② and ③ shown in FIG. 8, judgment is made in step 334 as to whether or not the pressure $P_1$ is equal to or lower than a predetermined setting of, for example, $-300$ mmHg. When the result of judgment in step 334 proves that $P_1 \leq -300$ mmHg, the data are so set in step 336 that the exhaust bypass valve 50 is fully closed for a period of time of $t_1$ msec, thereby assisting the increase in the rotation speed of the engine.

Figure 18:
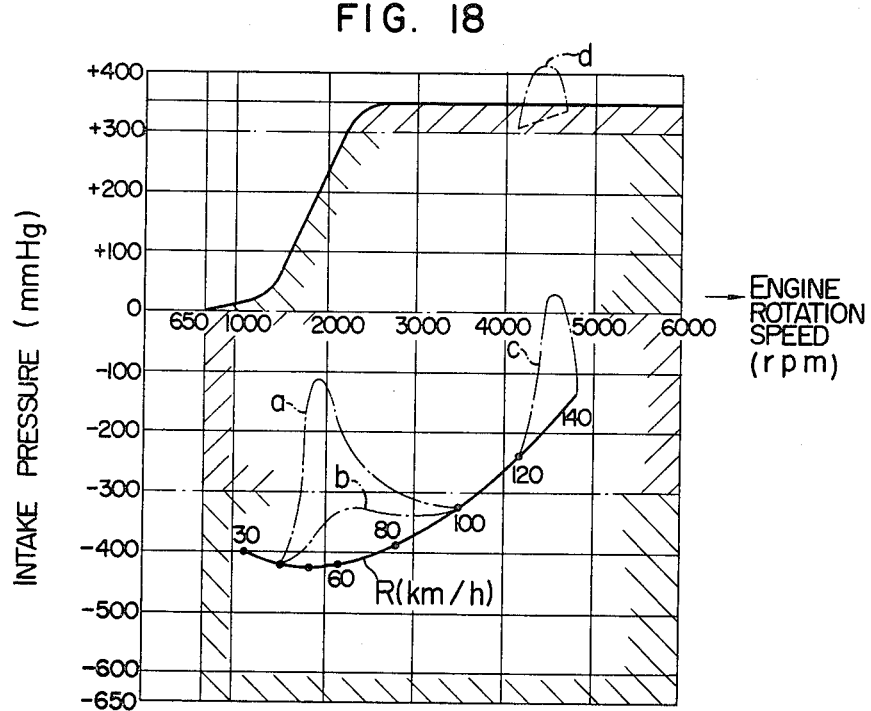
FIG. 18 is a graph showing the relation between the rotation speed of the engine and the intake pressure in the intake pipe during acceleration of the engine.

FIG. 18 shows the relation between the rotation speed N of the engine and the pressure $P_1$ in the intake pipe. In FIG. 18, R represents the speed of the vehicle. During the acceleration stage ② shown in FIG. 8, for example, the pressure $P_1$ in the intake pipe varies as shown by the one-dot chain curve a in FIG. 18, and, therefore, the exhaust bypass valve 50 is fully closed for a period of time of $t_1$ msec.

When, on the other hand, the result of judgment in step 334 proves that $P_1 > -300$ mmHg, judgment is then made in step 338 as to whether or not $P_1$ is equal to or lower than 0 mmHg.

When, for example, the pressure $P_1$ is represented by the one-dot chain curve C in FIG. 18, the exhaust bypass valve 50 is fully closed for a period of time of $t_2$ msec ($t_2 < t_1$) in step 340. Similarly, when the result of judgment in step 342 proves that $P_1 \leq 300$ mmHg, the exhaust bypass valve 50 is fully closed for a period of time of $t_3$ msec ($t_3 < t_2$) in step 344. When the pressure $P_1$ is higher than 300 mmHg, that is, when the engine rotating at a high rotation speed under a high load is further accelerated as, for example, shown by ③ in FIG. 8 and by the one-dot chain curve d in FIG. 18, closure of the exhaust bypass valve 50 will result in an excessively high supercharged air pressure which may destroy the engine. In such a case, the opening of the exhaust bypass valve 50 is controlled to be in accord with the static characteristics shown in FIG. 6.

When the result of judgment in step 332 proves that the acceleration is smaller than the setting m, judgment is made in step 346 as to whether or not $P_1 \leq -300$ mmHg. In the case of a gradual acceleration stage as shown by ④ in FIG. 8, the negative pressure $P_1$ or vacuum changes as shown by the one-dot chain curve b in FIG. 18. In such a case, the exhaust bypass valve 50 is fully closed for a period of time of $t_4$ msec in step 348. Similarly, in any one of later steps 350 to 356, the opening of the exhaust bypass valve 50 is suitably controlled. In this case, there is the relation $t_1 > t_2 > t_3 > t_4 > t_5 > t_6$.

In the case of an abrupt deceleration as shown by ⑤ in FIG. 8, the abrupt deceleration is detected in step 318, and the exhaust bypass valve 50 is fully opened for a period of time $t_7$ of, for example, 3,000 msec in step 358 so as to prevent occurrence of surging.

It will be understood from the foregoing detailed description of a preferred embodiment of the present invention that the rotation speed of the supercharger, hence, the supercharged air pressure can be efficiently controlled over a wide operation range of the internal combustion engine.

Although an actuator of the kind which actuates directly the exhaust bypass valve by a solenoid is employed in the embodiment of the present invention, a hydraulic pressure or a pneumatic pressure may be utilized as an actuating source for the exhaust bypass valve with its magnitude being controlled by a solenoid-operated valve, and a duty-controlled pulse signal may be applied to energize the solenoid-operated valve.

According to the present invention, a microcomputer is used so that the supercharged air pressure can be controlled to be optimum for the operating condition of the engine. Especially, the loss of supercharging in a low speed operation range of the engine can be minimized, while, on the other hand, the gain of supercharging in a high speed operation range of the engine can be greatly increased. Further, the torque in an intermediate speed range and the maximum output of the engine can also be improved. Furthermore, the high speed performance of the engine can be improved, and the supercharger and the engine can be protected against damage during deceleration of the engine.

Moreover, because of the fact that the supercharger can be incorporated as a part of the centralized control system controlling the entire internal combustion engine, the general control of the entire engine can be achieved in an optimized manner in addition to the attainment of the object of controlling the supercharged air pressure.

What is claimed is:

1. A system for controlling an exhaust gas-driven supercharger used in an internal combustion engine for an automotive vehicle including a turbine disposed in an exhaust gas passage of the engine to be driven by the stream of exhaust gases discharged from the combustion chambers of said engine into said exhaust gas passage, a supercharging compressor disposed in an intake air passage of said engine to be driven by said turbine, an exhaust gas bypass passage connecting between selected portions of said exhaust gas passage upstream and downstream of said turbine, and an exhaust bypass valve disposed midway of said exhaust gas bypass passage for regulating the quantity of exhaust gases flowing through said exhaust gas bypass passage, said control system comprising a plurality of electrical signal generating means for generating electrical signals indicative of the operating condition of said engine, knocking signal generating means for sensing the presence or absence of knocking in said engine and generating an electrical signal indicative of occurrence of knocking when knocking is present, control circuit means including memory means for storing a series of basic data of the controlled opening of said exhaust bypass valve corresponding to various operating conditions of said engine, said control circuit means reading out from said memory means a basic data of the controlled opening of said exhaust bypass valve on the basis of the electrical signals generated from said electrical signal generating means and, when said knocking signal generating means senses occurrence of knocking and generates the electrical signal indicative of occurrence of knocking, modifying the read-out basic data of the controlled opening thereby generating a corresponding digital output signal so as to provide a modified supercharged air pressure at which knocking does not occur, and actuator means for actuating said exhaust bypass valve in response to the digital signal applied from said control circuit means.

2. A supercharger control system as claimed in claim 1, wherein said electrical signal generating means include signal generators generating an electrical signal indicative of the quantity of intake air supplied to said engine and an electrical signal indicative of the rotation speed of said engine respectively, and said memory means stores the basic data of the controlled opening of said exhaust bypass valve determined by said intake air quantity and said engine rotation speed.

3. A supercharger control system as claimed in claim 1, wherein, when said engine is under deceleration, said control circuit means applies to said actuator means a digital signal which acts to urge said exhaust bypass valve to its full open position and maintain it in that position for a predetermined period of time.

4. A supercharger control system as claimed in claim 3, wherein said control circuit means determines that said engine is under deceleration in response to the application of electrical output signals from an idle switch sensing the idle opening of a throttle valve disposed in said intake air passage and a signal generator sensing the rotation speed of said engine.

5. A supercharger control system as claimed in claim 1, wherein, when said engine is under acceleration, said control circuit means applies to said actuator means a digital signal which urges said exhaust bypass valve to its full closed position and maintain it in that position for a predetermined period of time.

6. A supercharger control system as claimed in claim 5, wherein the on-duty of the digital signal applied from said control circuit means to said actuator means for maintaining said exhaust bypass valve in its full closed position is determined depending on the degree of acceleration and is so controlled by said control circuit means that the greater the acceleration, the on-duty is longer.

7. A supercharger control system as claimed in claim 6, wherein said control circuit means judges the degree of acceleration on the basis of the rate of change of an electrical output signal generated from a signal generator generating an electrical output signal indicative of the quantity of intake air.

8. A supercharger control system as claimed in claim 1, wherein, when said knocking signal generating means is not generating its electrical output signal indicative of occurrence of knocking, said control circuit means generates such a digital output signal that the basic data of the controlled opening of said exhaust bypass valve read-out from said memory means is further modified to provide a higher supercharged air pressure.

9. A supercharger control system as claimed in claim 1, wherein said actuator means is an electrically energized actuator which is directly coupled to said exhaust bypass valve for causing interlocking operation of the latter.

10. A supercharger control system as claimed in claim 9, wherein a controlled on-duty signal is applied from said control circuit means to said electrically energized actuator.

11. A method of operating a processor-controlled apparatus for controlling the operation of an exhaust gas-driven supercharger used in an internal combustion engine for an automotive vehicle including a turbine disposed in an exhaust gas passage of the engine to be driven by the stream of exhaust gases discharged from the combustion chambers of said engine into said exhaust gas passage, a supercharging compressor disposed in an intake air passage of said engine to be driven by said turbine, an exhaust gas bypass passage connected between selected portions of said exhaust gas passage upstream and downstream of said turbine, and an exhaust bypass valve disposed within said exhaust gas bypass passage for regulating the quantity of exhaust gases flowing through said exhaust gas bypass passage, said apparatus including a plurality of electrical signal generating means for generating electrical signals indicative of the operating condition of said engine, knocking signal generating means for sensing the presence or absence of knocking in said engine and generating an electrical signal indicative of the occurrence of knocking when knocking is present, and a memory having stored therein a plurality of data representative of predetermined degrees of opening of said exhaust bypass valve corresponding to various operating conditions of said engine;
said method comprising the steps of:
(a) reading out from memory data representative of a prescribed degree of opening of said exhaust bypass valve in accordance with electrical signals indicative of the operating conditions of said engine as generated by said electrical signal generating means;
(b) selectively modifying the data read out from memory in step (a) in response to the operation of said knocking signal generating means so as to produce modified data representative of a degree of opening of said exhaust bypass valve for which knocking does not occur; and
(c) controlling the operation of said exhaust gas bypass valve in response to the modified data produced in step (b).

12. A method according to claim 11, wherein step (b) comprises the step of modifying the data read out from memory in step (a) in accordance with the degree of knocking in said engine as detected by said knocking signal generating means.

13. A method according to claim 12, wherein said electrical signal generating means include signal generators generating an electrical signal indicative of the quantity of intake air supplied to said engine and an electrical signal indicative of the rotation speed of said engine, respectively, and said memory stores the data representative of the degree of opening of said exhaust bypass valve as determined by said intake air quantity and said engine rotation speed.

14. A method according to claim 11, wherein step (c) includes, in response to said engine being under deceleration, controlling said exhaust bypass valve so as to urge said valve to its fully open position and maintain it in that position for a predetermined period of time.

15. A method according to claim 14, wherein said apparatus includes means for determining that said engine is under deceleration in response to the application of electrical output signals from an idle switch sensing the idle opening of a throttle valve disposed in said intake air passage and a signal generator sensing the rotation speed of said engine.

16. A method according to claim 11, wherein step (c) includes, in response said engine being under acceleration, controlling said exhaust bypass valve so as to urge said valve to its fully closed position and maintain it in that position for a predetermined period of time.

17. A method according to claim 15, wherein said controlling step (c) includes generating a digital signal having an on-duty for maintaining said exhaust bypass valve in its fully closed position in accordance with the degree of acceleration and which is so controlled that the greater the acceleration, the longer the on-duty.

18. A method according to claim 17, wherein the degree of acceleration is established on the basis of the rate of change of an electrical output signal generated from a signal generator generating an electrical output signal indicative of the quantity of intake air.

19. A method according to claim 11, wherein step (b) comprises modifying said data read out from memory such that, when said knocking signal generating means is not generating its electrical output signal indicative of occurrence of knocking, said data is further modified to provide a higher supercharged air pressure.

20. A method according to claim 11, wherein step (c) comprises controlling an electrically energized actuator which is directly coupled to said exhaust bypass valve for causing interlocking operation of the latter.

21. A method according to claim 19, wherein step (c) comprises applying a controlled on-duty signal to said electrically energized actuator.

* * * * *